United States Patent [19]

Lynk, Jr. et al.

[11] Patent Number: 4,821,310

[45] Date of Patent: Apr. 11, 1989

[54] TRANSMISSION TRUNKED RADIO SYSTEM WITH VOICE BUFFERING AND OFF-LINE DIALING

[75] Inventors: Charles N. Lynk, Jr., Bedford; Eric R. Schorman, Beford, both of Tex.

[73] Assignee: Motorola, Inc., Schaumburg, Ill.

[21] Appl. No.: 136,601

[22] Filed: Dec. 22, 1987

[51] Int. Cl.$^4$ .............................................. H01Q 7/04
[52] U.S. Cl. ........................................ 379/63; 379/58; 455/54
[58] Field of Search ......................... 379/63, 60, 57, 58, 379/59, 96; 455/17, 18, 54, 56, 12; 340/825.44, 311.1, 313

[56] References Cited

U.S. PATENT DOCUMENTS

| | | | |
|---|---|---|---|
| 3,772,596 | 11/1973 | Edwards | 455/18 |
| 4,148,657 | 3/1979 | Hanni | 379/59 |
| 4,247,947 | 1/1981 | Miyamoto | 455/38 |
| 4,352,201 | 9/1982 | Miller | 455/58 |
| 4,471,165 | 9/1984 | De Fino et al. | 379/96 |
| 4,475,246 | 10/1984 | Batlivala et al. | 455/18 |
| 4,479,245 | 10/1984 | Batlivala et al. | 455/18 |
| 4,493,090 | 1/1985 | Gordon | 375/4 |
| 4,635,285 | 1/1987 | Coombes | 379/63 |
| 4,672,601 | 6/1987 | Ablay | 370/31 |
| 4,675,863 | 6/1987 | Paneth et al. | |
| 4,677,656 | 6/1987 | Burke et al. | 379/63 |
| 4,696,051 | 9/1987 | Breeden | 455/33 |
| 4,713,809 | 12/1987 | Mizota | 370/97 |
| 4,742,514 | 5/1988 | Goode et al. | 370/109 |

FOREIGN PATENT DOCUMENTS

0042441 4/1981 Japan ..................................... 379/61
0216545 9/1986 Japan ..................................... 379/60

Primary Examiner—Robert Lev
Attorney, Agent, or Firm—Steven G. Parmelee; Melvin A. Schechtman

[57] ABSTRACT

A trunked radio subscriber requesting dispatch service transmits a request for a channel and immediately begins to speak without waiting to receive permission to access the channel. The subscriber radio locally records the information to be transmitted and, upon being assigned a channel, begins to reproduce and transmit the information. Recording and reproduction provides delay to span the time between request for and assignment to a channel and eliminates the need for the subscriber to wait to transmit or to quickly seize a channel assigned after an initial refusal. This enhances overall response time and increases time available for transmitting information signals. During interconnect calling, a trunked system alternately assigns inbound and outbound frequencies only as required for back-and-forth communication between simplex radio and duplex wireline subscribers. Voice buffering allows the parties to begin talking during the delay between request for and assignment of frequencies. The invention further provides for call origination by either radio or wireline subscribers without use of information channels. These procedures release resources and make them available to other callers.

10 Claims, 5 Drawing Sheets

—PRIOR ART—
FIG. 1

TRANSMISSION TRUNKED RADIO SYSTEM WITH VOICE BUFFERING AND OFF-LINE DIALING

BACKGROUND OF THE INVENTION

1. Technical Field of the Invention

This invention pertains to improved resource allocation and response time in trunked radio communication systems.

2. Description of the Prior Art

A trunked radio communication system is one in which a number of radio users (subscribers) share a group of communication channels, which is practical when each user requires a channel only a small percentage of the time and few will be communicating simultaneously. Subscribers may use mobile or portable two-way radio units and fixed base dispatch consoles. Typical systems use radio repeaters to provide the communication channels. A repeater receives inbound transmissions from subscriber units on a first path and rebroadcasts the transmissions at higher power on a second, outbound path destined to other units in the field. Typical trunking systems use different assigned frequencies for these simultaneous paths. Each pair of inbound and outbound frequencies makes up a single communication channel, of which a trunked system has several. Channels carrying voice and other message communications are known as information channels; those carrying signalling and control information are known as control channels. These channels commonly involve simplex communication: that is, alternate, rather than simultaneous, transmission and reception.

A trunked system typically requires that a user desiring to communicate first request permission to access the group of channels and then wait for permission and for an assignment to a particular channel. The trunked system provides means for receiving requests and for transmitting assignments, often by digital signalling on the control channel. If the system operates under the discipline of transmission-trunking, the user retains his channel assignment for only a single transmission; if the system uses message-trunking, the user retains his assignment until completing an entire message comprising several back-and-forth transmissions. Upon completing the transmission or message, respectively, the subscriber relinquishes the channel to the pool of resources for use by others. Because trunked systems involve sharing resources, subscribers must often wait for availability of information channels, in which case the trunk controller responds to a request for channel with a busy signal and notifies the subscriber when a channel later becomes available. U.S. Pat. No. 4,635,285, *Communication System with Voice Priority for Remote Stations*, issued Jan. 6, 1987, to Coombes and incorporated herein by reference, provides details of trunked system operation and signalling protocols.

Trunked radio systems generally provide dispatch communication and may include capability for wireline interconnection. Dispatch communication is the delivery of messages from a dispatcher to subscribers and the reception of responses from subscribers. It is common for the trunked system to treat all communication positions, i.e., dispatcher and subscribers, equivalently. To make a transmission, a dispatcher or subscriber will place a request for a channel, wait for a grant of permission and an assignment to a channel, and begin to transmit on the assigned channel. After receiving a transmission, a subscriber who wishes to respond will, in turn, begin transmission on an assigned channel. Communication takes place by transmission from a talking subscriber to the central location on an inbound frequency and repeated transmission to listening subscribers on the paired outbound frequency.

Wireline interconnection usually involves coupling a simplex radio subscriber on the trunked system with a subscriber of a duplex wireline telephone network. The reader is referred to U.S. Pat. No. 4,677,656, *Telephone-Radio Interconnect System*, issued Jun. 30, 1987, to Burke, et al., and incorporated herein by reference, for details of interconnect communication and call origination.

A trunked interconnect system following prior art practices will simultaneously assign inbound and outbound frequencies and will maintain the assignments for the duration of a conversation. The radio subscriber transmits under push-to-talk control on the inbound frequency; information received at the repeater couples to the wireline network instead of repeating on the paired outbound frequency. Signals from the wireline subscriber couple to the outbound repeater for broadcast to the radio subscriber; these signals may, but need not, key the repeater by voice-operated control. The duplex wireline subscriber can always hear and may, therefore, be interrupted by the radio subscriber. While transmitting, the simplex radio subscriber does not hear, and cannot be interrupted by, the wireline party.

Access to the wireline network from a trunked system requires a call origination procedure. One often used is for a radio subscriber to place a request for interconnect service along with his request for a channel. When a channel capable of supporting interconnect service becomes available, the controller assigns and grants permission to use it. The radio subscriber originates the wireline call by transmitting tone or data signalling information (e.g., DTMF dual-tone multi-frequency or packet data encoded telephone number), which couples to the wireline network. The system transmits the call progress information to the radio subscriber on the paired outbound frequency. The radio subscriber hears busy tones or ringing tones and eventually becomes connected with the wireline party or terminates his call attempt.

Several features of prior art trunked systems have proven objectionable. First, when the system is heavily loaded with radio traffic, subscribers wishing to transmit must wait for vacant channels, which often involves receiving a busy signal and waiting for a call-back with permission to transmit. Upon receiving the call-back announcement, the requesting subscriber may be given a short response time in which to seize the assigned channel. Subscribers experience access delays, and the response time for channel seizure costs valuable communications time.

Second, prior art systems assign inbound and outbound frequencies together for interconnect traffic, even though the simplex radio subscriber cannot make use of them simultaneously. Interconnect conversations are generally more protracted than dispatch traffic, so unnecessarily assigning paired channels removes valuable resources from the pool available to interconnect calls.

Third, the call origination procedures taught by the prior art consume valuable information channel time that might be used for other information communications.

SUMMARY OF THE INVENTION

The invention allows a trunked radio subscriber requesting dispatch service to transmit a request for a channel and immediately begin to speak without waiting to receive permission to access the channel. The subscriber unit locally records the information to be transmitted and, upon being assigned a channel, begins to reproduce the information and to transmit it on the channel. If the channel is assigned before the subscriber has finished speaking, the recording and reproduction process provides the effect of time delay to span the actual delay between request for and receipt of permission to transmit. The invention eliminates the need of subscribers to delay transmission and to quickly seize a channel granted after an initial access refusal. The invention also enhances overall response time and increases time available for transmission of information signals.

According to an aspect of the invention pertaining to interconnect calling, a trunked system alternately assigns inbound and outbound information frequencies only as required for back-and-forth communication between simplex radio and duplex wireline subscribers. Voice buffering allows the parties to begin talking during the delay time between request for and assignment of frequencies. The system further provides for call origination by either radio or wireline subscribers without use of information channels. These procedures, which differ from prior art teachings to assign inbound and outbound frequencies as pairs for the duration of a call and to complete the call origination procedure on an information channel, release resources and make them available to other callers.

BRIEF DESCRIPTION OF THE DRAWING

The invention may be better understood by reference to the drawing, in which.

DETAILED DESCRIPTION OF THE PREFERRED EMBODIMENT

Figure 1:
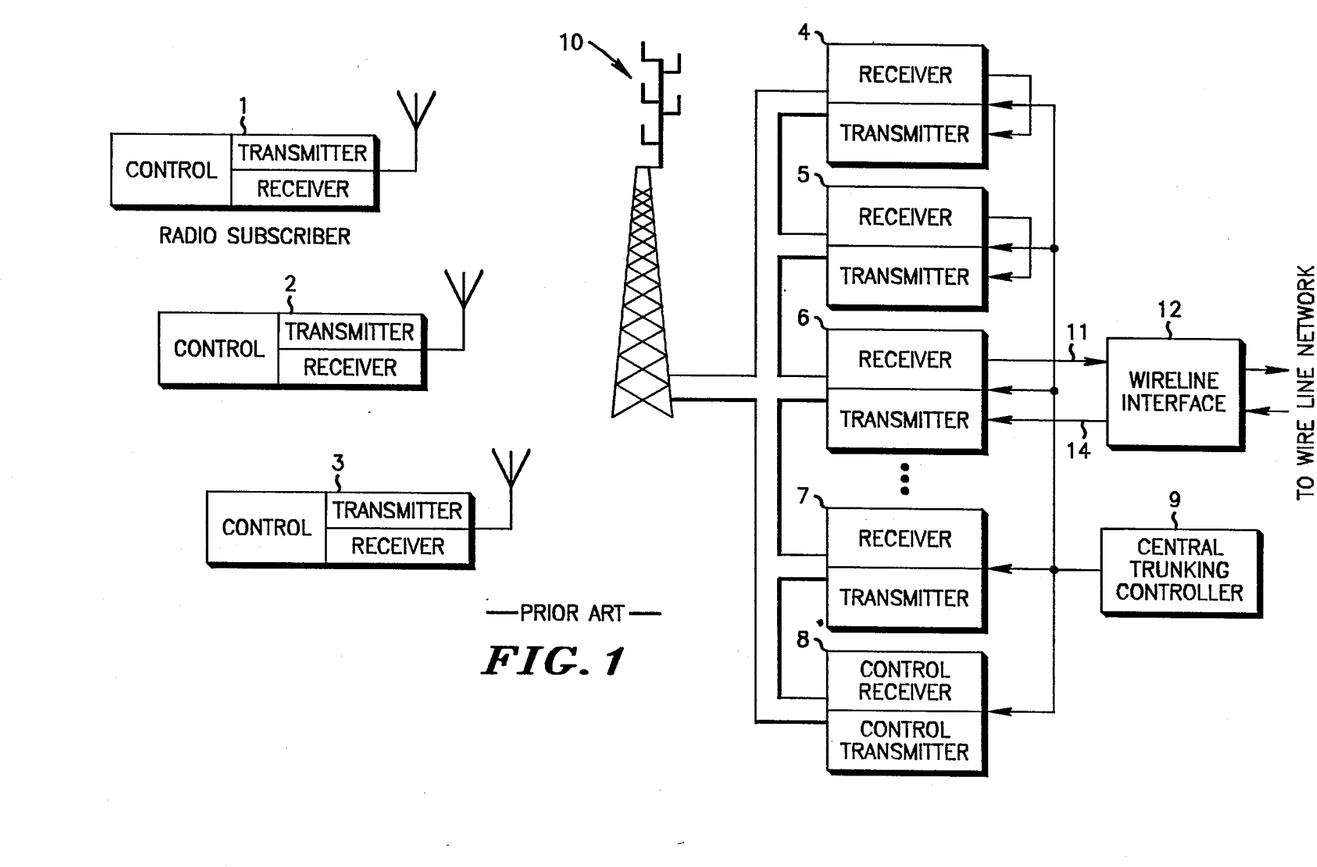
FIG. 1 shows a typical trunked radio system found in the prior art, including subscriber radio units, a wireline interconnection interface, trunked repeaters, and a trunking controller.

FIG. 1 shows a prior art trunked radio system that could incorporate the principles of the invention. The system comprises a number of subscriber radios (1, 2, and 3), which could be mobiles, portables, or dispatch consoles. A group of trunked repeaters (4, 5, 6, 7, 8), a central trunking controller (9), and an antenna system (10) provide the communication channels. Each repeater has a receiver and transmitter and provides a single communication channel to the system; the channel designated by reference numeral 8 carries control information. Repeaters 4 and 5 provide dispatch service: received audio couples to the transmitter portion of the repeater and is rebroadcast on the paired frequency. Repeater 6 provides interconnection service: received audio 11 couples through the wireline interface 12 onto the wireline network; audio from the wireline network couples through the interface and goes on line 14 to the transmitter for broadcast to the interconnected radio subscriber.

Figure 2:
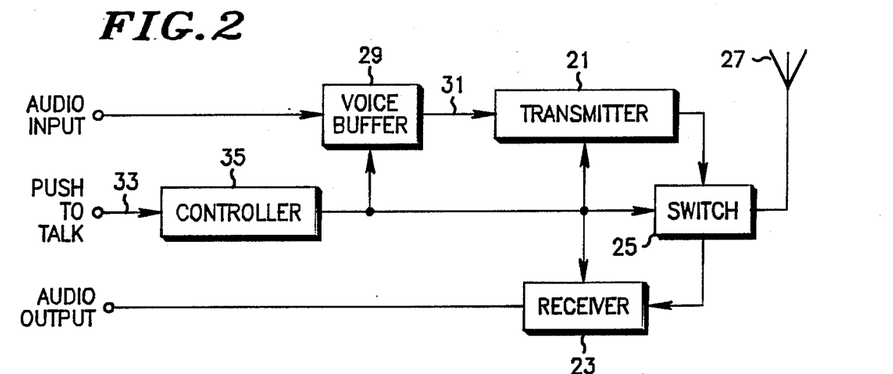
FIG. 2 shows a simplified block diagram of a two-way subscriber radio with provision for voice buffering, constructed according to the invention.

FIG. 2 shows details of a subscriber two-way radio unit constructed according to the invention. The radio includes a transmitter 21 and a receiver 23 coupled through an antenna switch 25 to a common antenna 27. Voice audio information from the subscriber goes through a voice buffer 29 before coupling to the modulation port 31 of the transmitter. To initiate a transmission, the subscriber depresses a push-to-talk (PTT) switch 33, which causes the trunked controller 35 of the radio to key the transmitter and to send a channel request to the central trunked controller. PTT also causes the voice buffer to begin to record a representation of the voice and to continue to record until the user has finished speaking or until the central controller responds with a grant of and an assignment to an information channel. Voice buffering allows the user to begin to speak immediately without waiting for a channel assignment. The subscriber unit controller may alert the user if the buffer has filled before he has completed speaking, which might occur with a long message and long delay for channel access.

Upon receiving the channel assignment, the subscriber radio controller causes the voice buffer to reproduce the stored voice information and to couple it to the transmitter for broadcast. Depending on the delay between PTT and the channel assignment, the buffer functions as a time delay or as a store and forward memory. When channel loading conditions are light, grant to talk will come soon after request, probably before the subscriber has finished speaking. The buffer will reproduce delayed information as new information is still being stored. When channel loading conditions are heavy, assignment delay may exceed the duration of the transmission. The buffer will hold the recorded voice until grant of the channel; then it will reproduce the voice information, which will modulate the transmitter. On subsequent transmissions in a message, channel assignment will likely be more rapid, especially if the system has a recent-user queue, which gives priority to channel requests belonging to continuing conversations. Subscribers hearing a buffered transmission will be aware of delay in a conversation, but the delay time will likely be shorter than in prior art situations because there is no need to manually respond to a call-back signal.

Figure 3:
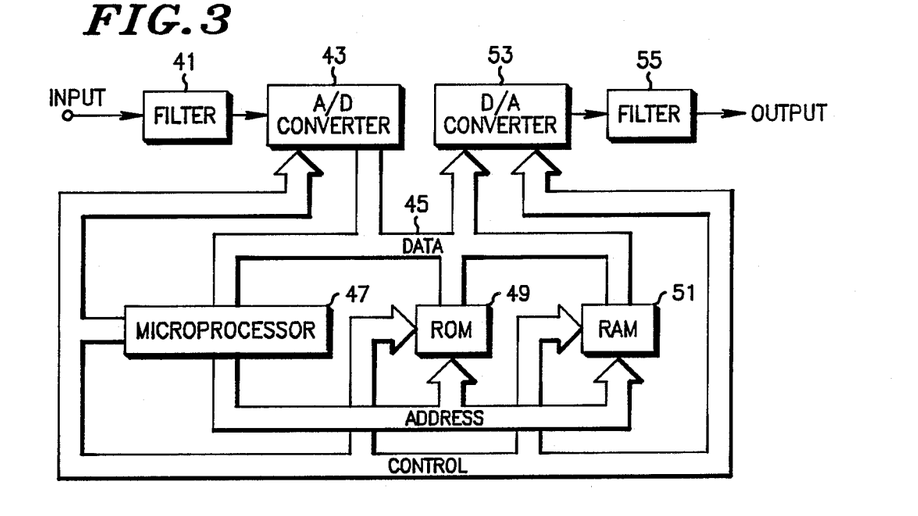
FIG. 3 shows the voice buffering circuits of FIG. 2 in greater detail.

The voice buffer of the preferred embodiment is a digital storage system in which audio to be buffered is sampled, digitized, and stored in a first-in, first-out (FIFO) memory under control of a microprocessor. Earlier stored samples can be read out from the FIFO as new samples are stored, which allows the FIFO to delay an incoming signal. FIG. 3 shows details of the voice buffer. Audio input goes through a band-limiting filter 41 to an analog to digital (A/D) converter 43 that provides digital output on data bus 45. A microprocessor 47, read-only-memory (ROM) 49, and random-access-memory (RAM) 51 provide control and storage functions. Under command of the microprocessor (which could be part of the radio controller), the A/D samples the filtered input signal at a rate sufficient to allow reconstruction, and it provides digital samples that the microprocessor causes to be stored in the buffer RAM 51.

To reproduce the stored, digitized voice, the microprocessor causes data from the RAM to couple on the data bus to a digital to analog (D/A) converter 53. The D/A produces analog samples, which couple through reconstruction filter 55 and modulate the transmitter.

The voice buffer has independent controls for addressing read and write data to allow simultaneous input and output of digitized voice information. For example, if samples were taken at a given sampling rate from the input signal, the RAM could read and write at different time slots during each sampling period to allow the input and output sampling rates to maintain synchronism. The microprocessor would keep track of separate first-in, first-out addressing pointers for input read and output write data, so that the buffer could function as an elastic FIFO and provide exactly the required time delay to account for the time between beginning of speaking and assignment of a channel on which to transmit.

Figure 4:
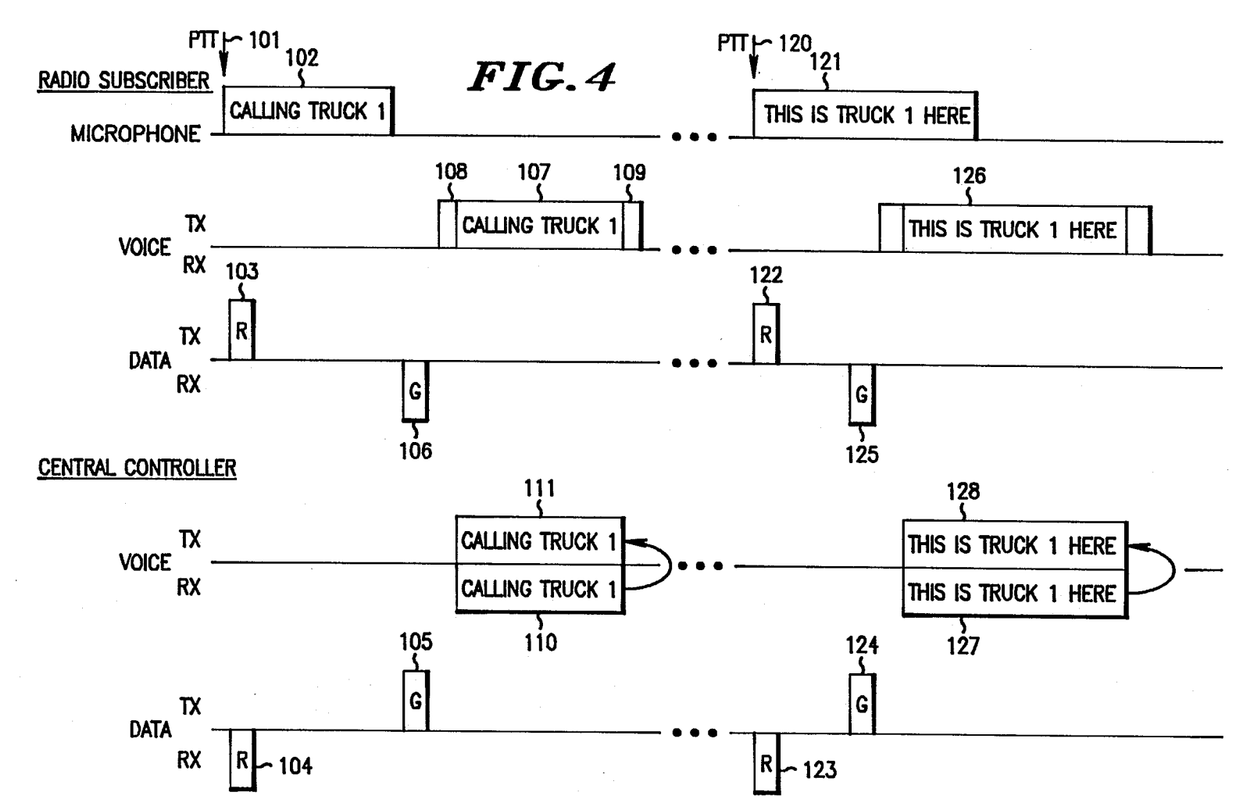
FIG. 4 diagrams a trunked dispatch call with voice buffering according to the invention.

FIG. 4 illustrates the relative timing of events in a dispatch call. A subscriber initiates transmission by depressing PTT (101) and talking (102). PTT starts voice buffering and initiates a request for channel (103). Some time after receiving the request (104), the central controller finds an available channel, assigns it to the call, and sends a grant message (105) to the requesting unit. The delay may be longer than the time for which the subscriber speaks, as shown here. The requesting unit receives the grant (106) and begins transmission of reproduced voice from the buffer (107). The transmission may include beginning of transmission (BOT 108) and end of transmission (EOT 109) signalling to control the repeater. The voice channel repeater couples received voice (110) to the paired outbound frequency (111).

A subscriber responding to the transmission will depress his PTT (120) and state his reply (121). A channel request will go to the central controller (122, 123); the controller will respond with channel assignment and grant as one becomes available (124, 125), which may occur before the responding party has finished speaking. His subscriber unit will reproduce voice from its buffer (126) even as further speech continues to fill it, and the repeater will receive (127) and re-transmit (128) the reproduced voice.

Figure 5:
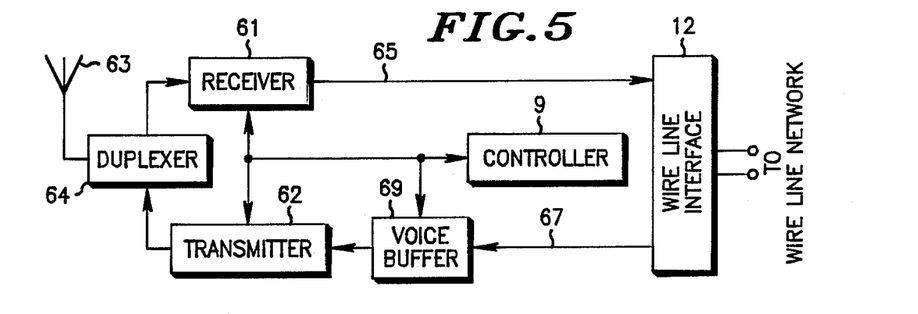
FIG. 5 shows a trunked repeater configured for wireline interconnect service with voice buffering provisions according to the invention.

The invention also provides for voice buffering in interconnect service. FIG. 5 shows a channel repeater as it would be configured for wireline interconnection. The repeater includes a receiver 61 and a transmitter 62 coupled to a common antenna 63 by a duplexer 64. Controller 9 represents control functions performed by the central trunking controller available to the trunked repeaters. For interconnect service, the received signals are not rebroadcast; instead, received audio 65 couples through the wireline interface 12 onto the network for routing to a wireline subscriber. Audio 67 from the wireline subscriber couples through the interface to the repeater transmitter through a voice buffer 69 such as that described in FIG. 3.

Trunked interconnect operation according to the invention differs in three aspects from prior art teachings. First, it provides off-line call origination; that is, dialing occurs without use of information channel resources. Second, inbound and outbound frequencies are assigned separately on demand, rather than being paired and retained for the duration of a conversation. Third, because there will be delays in assigning frequencies on demand, voice buffering is provided to allow subscribers to begin speaking immediately, as in the dispatch situation.

Figure 6:
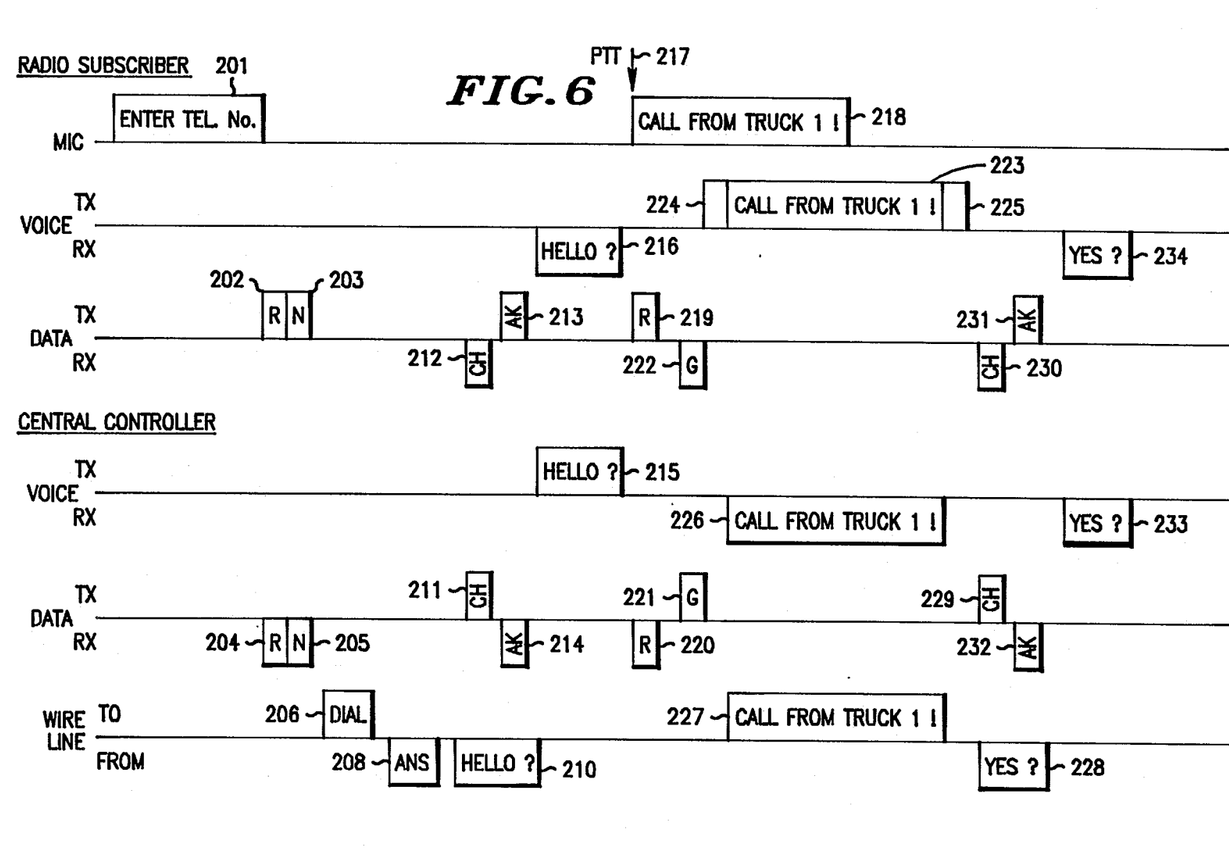
FIG. 6 diagrams a trunked interconnect call originated by a radio subscriber according to the invention.

FIG. 6 illustrates the steps in an interconnect call originated by a radio subscriber. On a keypad, which may be part of the radio microphone, the subscriber composes and verifies the telephone number of the wireline party (201) and activates a function by which his radio sends a request for interconnect service to the central controller (202) and includes the phone number digitally encoded as a data packet (203). Upon receiving the request and data (204, 205), the controller dials the number (206) and monitors the call progress. If there is a busy signal or no answer after a specified number of rings, the controller notifies the radio subscriber on the control channel. If the wireline party answers (208), the controller initiates the channel assignment routine to assign an outbound channel. At the same time, voice buffering begins to record the response (210) of the called wireline party during the time before a channel becomes available. The system can warn the wireline party to wait if the assignment takes longer than the available buffering time: for example, the controller might respond with a message such as "Please wait for a mobile caller." Up to this point, no transmissions have used information channel resources.

When an outbound frequency becomes available, the trunking controller sends a command (211, 212) for the radio subscriber unit to go to the assigned channel to receive an outbound voice transmission. Upon acknowledgment (213, 214) by the radio subscriber, the central controller transmits buffered voice on the outbound frequency (215). After the radio party has heard the wireline party finish speaking (216), he depresses PTT (217) and responds (218). PTT triggers a request for channel (219, 220) and causes the radio response to be recorded. The central controller responds by de-keying the outbound transmitter and, upon availability, granting an inbound channel (221). Upon receiving the grant (222), the subscriber radio begins to transmit from its voice buffer on the assigned inbound channel (223); the delayed voice will be received (226) and coupled to the wireline (227). The transmission may include BOT (224) and EOT (225) signalling to facilitate control operations: e.g., the central controller can use EOT from the subscriber radio to request an outbound channel for the reply (226) forthcoming from the wireline party. The controller signals the availability of an outbound channel (229, 230) and, after acknowledgment from the radio subscriber (231, 232), transmits from the wireline interface voice buffer (233, 234).

Figure 7:
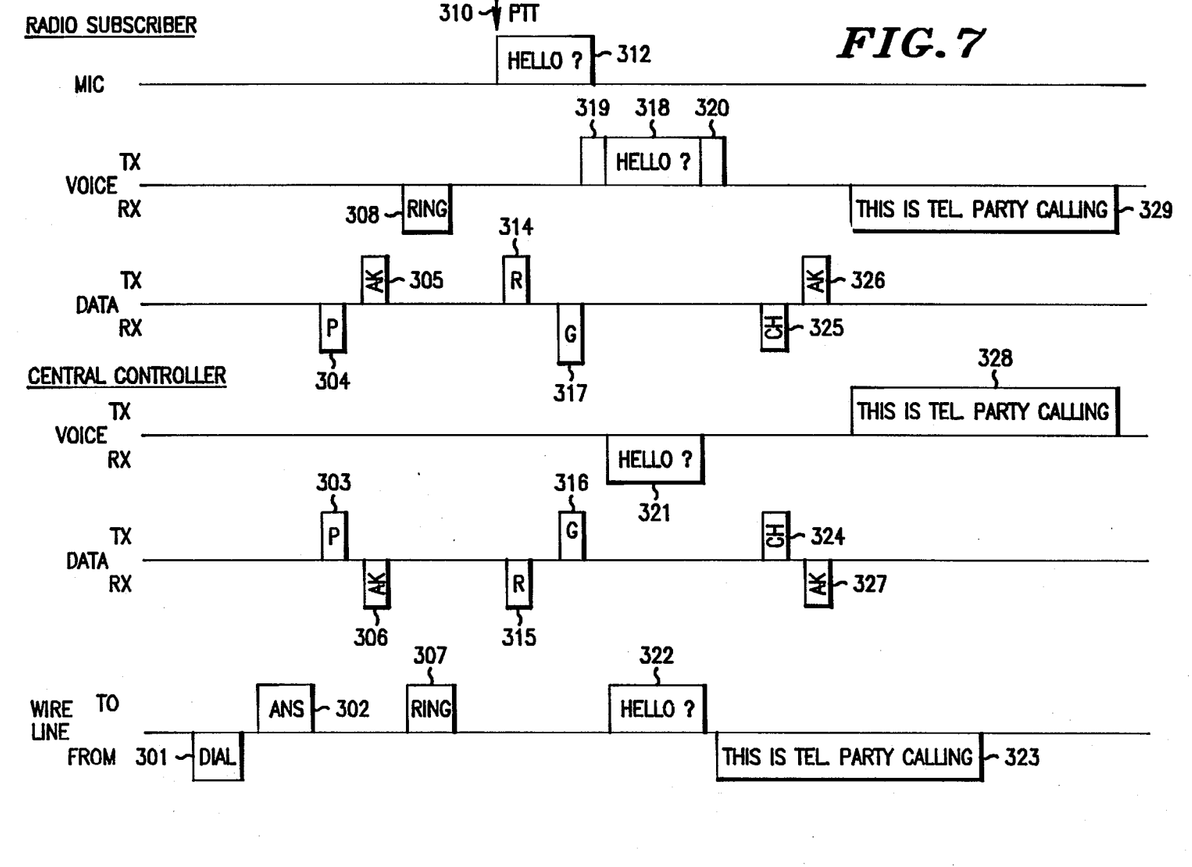
FIG. 7 diagrams a trunked interconnect call originated by a wireline subscriber according to the invention.

Call origination by the wireline party operates similarly, as FIG. 7 illustrates. When the calling party becomes connected to the interface terminal by dialing the number of a radio subscriber (301, 302), the trunked controller alerts the radio party of a call by a paging data packet transmitted on the signalling channel (303, 304). The radio unit acknowledges (305, 306), after which the central controller provides ringing tones (307, 308). No request for information channel assignment occurs until the radio subscriber accepts the page from the controller and depresses PTT (310) to answer.

Using the voice buffering of the invention, the radio subscriber may immediately begin to speak (312); his radio will send a channel request (314, 315) in response to PTT. Upon availability and grant of a channel from the central controller (316, 317), the subscriber radio reproduces the buffered reply (318. As described earlier, beginning- and end-of-transmission signals (319, 320) control the outbound frequency transmitter.

The trunked repeater couples the voice reply (321) from the radio to the wireline interface (322), through which the wireline party hears the delayed voice and responds (323). The EOT signal (320) from the radio will have begun a channel request procedure, and, when an outbound channel becomes available, it will be granted (324, 325). After the radio tunes to the outbound frequency and acknowledges (326, 327), the central controller will transmit the wireline reply from the interface voice buffer (328, 329).

An important aspect of this overall process is that instead of maintaining a paired frequency assignment for the duration of the call as taught by the prior art, the system assigns channels according to demand from the simplex radio subscriber. When the radio subscriber wants to talk, he depresses PTT, and his controller requests an inbound frequency channel. The central controller terminates the outbound frequency assignment and, on availability, assigns an inbound path. When the delayed transmission from the radio subscriber indicates end-of-transmission, the central controller releases the inbound frequency and assigns an outbound frequency for the wireline reply. The normally paired frequency, which is not assigned, can be used as demanded for other interconnect calls and can provide increased system capacity and decreased access time for those calls. The unassigned frequency would not be suitable for dispatch calls, which simultaneously use both the inbound and the outbound frequencies of the repeater.

Voice buffering during the assignment delay allows each party to begin speaking without waiting for channel assignment. Buffering also preserves the initial portion of a reply spoken quickly by an inexperienced wireline party, often not heard in prior art interconnect systems because of the slow turn-around from transmit to receive of the two-way radio.

What is claimed is:

1. A method of communicating on a trunked radio system comprising the steps of:
   requesting an assignment to an information channel on which to transmit and waiting to receive the assignment;
   while waiting, recording a representation of information to be transmitted; and
   receiving the assignment and, upon receiving the assignment, reproducing and transmitting on the information channel at least a part of the delayed version of the representation of the information.

2. The method of claim 1 including the step of notifying that the part of the delayed version has been transmitted.

3. In a trunked radio system that can carry dispatch traffic and wireline interconnect traffic, in which dispatch traffic uses information channels comprising paired inbound and outbound channels that convey transmissions from requesting subscribers to receiving subscribers, and in which interconnect traffic uses information channels comprising inbound channels that convey information from radio subscribers to wireline subscribers and outbound channels that convey information from wireline subscribers to radio subscribers, a method of assigning information channels to an interconnect call comprising the steps of:
   upon a request by a radio subscriber for assignment to an information channel, assigning only an inbound channel to the radio subscriber and making available for other interconnect calls the outbound channel that would be paired with the inbound channel for dispatch traffic;
   after a transmission by the radio subscriber, assigning only an outbound channel to the wireline subscriber and making available for other interconnect calls the inbound channel that would be paired with the outbound channel for dispatch traffic; and
   continuing to assign inbound and outbound channels in like manner until a completion of the interconnect call.

4. The method of assigning information channels for an interconnect call according to claim 3 including the steps of:
   upon a request by the radio subscriber for assignment to an information channel, recording, while waiting to receive the assignment, a representation of information to be transmitted by the radio subscriber and, upon receiving the assignment, reproducing and transmitting on the inbound channel at least a part of a delayed version of the representation of the information to be transmitted by the radio subscriber; and
   after the transmission by the radio subscriber and while waiting for the wireline subscriber to be assigned an outbound channel, recording a representation of information to be transmitted by the wireline subscriber and, upon being assigned, reproducing and transmitting on the outbound channel at least a part of a delayed version of the representation of the information to be transmitted by the wireline subscriber.

5. In a trunked radio system having information and control channel resources, a method of originating an interconnect call from a radio subscriber to a wireline subscriber without using information channel resources comprising the steps of:
   at the radio subscriber, locally encoding a telephone number of the wireline subscriber and, using control channel resources, requesting interconnect service and transmitting a representation of the telephone number;
   at a central controller of the trunked radio system, placing a call to the wireline subscriber;
   responding to progress information about the call, and, using control channel resources, notifying the radio subscriber of the progress information; and
   initiating an assignment of an outbound channel to the wireline subscriber, if the wireline subscriber answers the call.

6. The method of claim 5 including buffering information to be transmitted from the wireline subscriber according to the steps of:
   while waiting for the assignment of the outbound channel, recording a representation of the information to be transmitted from the wireline subscriber;
   receiving the assignment; and
   upon receiving the assignment, reproducing and transmitting on the outbound channel at least a part of a delayed version of the representation of the information to be transmitted.

7. A radio subscriber unit, for use in a trunked radio communication system, comprising:
   means for requesting an assignment to an information channel on which to transmit;
   means for recording a representation of information to be transmitted, while waiting to receive the assignment;
   means for reproducing, upon receiving the assignment, at least a part of a delayed version of the representation of the information; and
   means for transmitting the part of the delayed version on the information channel.

8. The subscriber unit of claim 7 including means for notifying that the part of the delayed version has been transmitted.

9. In a trunked radio system having information channel resources and control channel resources, means for originating an interconnect call from a radio subscriber to a wireline subscriber without using information channel resources comprising:
   at the radio subscriber unit, means for locally encoding a telephone number of the wireline subscriber and means for requesting interconnect service and transmitting a representation of the telephone number using control channel resources;
   at a central controller of the trunked radio system, means for placing a call to the wireline subscriber, means for responding to progress information about the call, and means for notifying the radio subscriber of the progress information using control channel resources; and
   means for initiating an assignment of an outbound channel to the wireline subscriber if the wireline subscriber answers the call.

10. The means of claim 9 for originating an interconnect call including means for buffering information to be transmitted from the wireline subscriber comprising:
   means for recording, while waiting for the assignment to the outbound channel, a representation of the information to be transmitted from the wireline subscriber; and
   means for reproducing and transmitting on the outbound channel at least a part of a delayed version of the representation of the information to be transmitted, upon receiving the assignment.

* * * * *